United States Patent

Saliba

[19]

[11] Patent Number: 6,075,678
[45] Date of Patent: *Jun. 13, 2000

[54] PIVOTING LEVER CAM GUIDE TAPE HEAD POSITIONER

[75] Inventor: George A. Saliba, Northboro, Mass.

[73] Assignee: Quantum Corporation, Milpitas, Calif.

[*] Notice: This patent is subject to a terminal disclaimer.

[21] Appl. No.: 09/121,924

[22] Filed: Jul. 24, 1998

Related U.S. Application Data

[63] Continuation-in-part of application No. 09/046,873, Mar. 24, 1998.

[51] Int. Cl.[7] .................................. G11B 5/55; G11B 5/56
[52] U.S. Cl. ........................................... 360/106; 360/109
[58] Field of Search ..................................... 360/106, 109

[56] References Cited

U.S. PATENT DOCUMENTS

| | | | |
|---|---|---|---|
| 4,313,143 | 1/1982 | Zarr | 360/106 |
| 4,750,067 | 6/1988 | Gerfast | 360/106 |
| 5,105,322 | 4/1992 | Steltzer | 360/106 |
| 5,191,492 | 3/1993 | Nayak et al. | 360/78.02 |
| 5,280,402 | 1/1994 | Anderson et al. | 360/106 |
| 5,379,170 | 1/1995 | Schwarz | 360/109 |
| 5,450,257 | 9/1995 | Tran et al. | 360/76 |
| 5,457,586 | 10/1995 | Solhjell | 360/77.04 |
| 5,523,904 | 6/1996 | Saliba | 360/77.12 |
| 5,675,448 | 10/1997 | Molstad et al. | 360/77.12 |
| 5,680,278 | 10/1997 | Sawtelle, Jr. | 360/106 |
| 5,726,834 | 3/1998 | Eckberg | 360/106 |

OTHER PUBLICATIONS

Copending commonly assigned U.S. Patent Application SN 08/918,477 by Kasetty filed on Aug. 26, 1997 for "Tape Head Positioning Device for Adjusting Head Tilt".

*Primary Examiner*—A. J. Heinz
*Attorney, Agent, or Firm*—Steven G. Roeder

[57] ABSTRACT

A fine lateral head positioner for a tape drive includes a frame mounted to a base of a tape transport. A tape head slides laterally along a head guide. A guide beam actuated by a fine position actuator applies limited transverse adjustments to the tape head relative to a tape transport path via a cam and cam-follower arrangement. A coarse positioner between the frame and the base provides coarse position adjustment of the tape head laterally among multiple sets of parallel tracks defined along a longitudinal direction of a magnetic tape moving along the tape transport path, and the guide beam provides fine position adjustment of the tape head enabling it to follow in real time a particular set of parallel tracks of the tape during each data writing or reading operation.

43 Claims, 4 Drawing Sheets

PIVOTING LEVER CAM GUIDE TAPE HEAD POSITIONER

REFERENCE TO RELATED APPLICATION

This is a continuation-in-part of U.S. patent application Ser. No. 09/046,873, filed on Mar. 24, 1998, pending and entitled: "Dual Actuator Pivoting Lever Tape Head Positioner,

SUMMARY OF THE INVENTION

The present invention relates to tape recording and playback devices and subassemblies thereof. More particularly, the present invention relates to a tape head positioner subassembly having a pivoting lever cam guide for fine positioning a tape head transversely to a magnetic tape carrying multiple longitudinal recording tracks and head servo information.

BACKGROUND OF THE INVENTION

Tape recording systems employing multiple parallel longitudinal tracks recorded on e.g. one half inch tape are known. Each track typically extends for the entire useful length of the tape, which may be 1800 feet or longer. A head structure contains multiple read/write head elements. When user data is being recorded, a first set of tracks is recorded as the tape moves in a first or forward direction across the heads. When the end of the tape is reached, the head structure is repositioned, and a second set of tracks is recorded as the tape moves in a second or reverse direction across the heads. This back-and-forth recording process continues until the tape is completely filled up with user data, or until a host computer stops sending user data to the tape recording system.

A known coarse positioner mechanism is described in commonly assigned U.S. Pat. No. 5,105,322 to Steltzer, entitled: "Transverse Positioner for Read Write Head", the disclosure thereof being incorporated herein by reference. In this prior patent a moveable head carriage supported the tape head structure. The head carriage carried one or more read-write head pairs of the head structure. Eight write heads, and four read heads, were typically carried by the head structure, in a four-channel tape transport. The head carriage engaged a lead screw which was rotated by a stepper motor mounted to a base of the tape transport mechanism. The lead screw, and a parallel guidepost, enabled the head carriage to be movably positioned transversely relative to a direction of travel of the tape. Thus, by energizing the stepper motor, the head carriage was stepped across the track recording positions of the tape, as the tape streamed back and forth from end to end across the head structure during writing/reading operations.

The known coarse positioner operated in a quasi-open loop fashion in the sense that servo patterns were recorded at each end of the tape and were read and used for precisely positioning the head structure at nominal track centerline of the tracks being followed during an ensuing passage of the tape across the heads. However, while the known coarse positioner worked satisfactorily for tape track densities on the order of 256 tracks per inch, instantaneous lateral tape motion disturbances effectively limited the number of tracks that could be defined on the tape storage medium.

Some later improvement was obtained by the use of azimuth recording techniques, such that the head structure confronted the lineal tracks at a first azimuth angle during a pass from beginning of tape to end of tape, and at a second azimuth angle differing from the first during a reverse direction pass from end of tape to beginning of tape. The resultant data track recording patterns defined herringbone geometry and achieved a linear track density of e.g. 416 tracks per inch. An example of an azimuth recording system is given in commonly assigned U.S. Pat. No. 5,523,904 to the present inventor, entitled: "Linear Tape Write Servo Using Embedded Azimuth Blocks", the disclosure thereof being incorporated herein by reference. A first example of an azimuth head positioning mechanism is given in commonly assigned copending U.S. patent application Ser. No. 08/918, 477 filed by Kasetty on Aug. 26, 1997, entitled: "Tape Head Positioning Device for Adjusting Head Tilt", and a second example of an azimuth head positioning mechanism is given in commonly assigned U.S. Pat. No. 5,680,278 to Sawtelle, Jr., entitled: "Apparatus for Combining Linear and Rotational Motion of an Azimuth Read-Write Head". The disclosures of the pending application of Kasetty and the patent of Sawtelle, Jr., are incorporated herein by reference.

While these prior approaches have worked to enable increases in track densities, a limitation with open loop or quasi closed loop positioning remained, due to lateral tape motion caused by a number of vibration excitation sources, including the supply reel and motor, take-up reel and motor, and guide rollers which guide the tape along a predetermined tape path across the head structure. These sources may separately or additively contribute to cause lateral tape motion. While prior efforts to reduce causes of lateral tape motion have been successful, as track densities increase (meaning that track widths are decreased) these prior efforts have reached practical limits, and have necessitated use of closed loop fine positioning servo mechanisms to provide relatively instantaneous adjustment of the tape head.

It has been proposed to combine a stepper motor as a coarse positioner with a linear voice coil motor acting as a fine track positioner to realize a head support structure capable of being positioned in closed loop during track following operations of the tape transport mechanism. One example of a dual actuator is provided by U.S. Pat. No. 5,280,402 to Anderson et al., entitled: "Combined Stepper Motor and Voice Coil Head Positioning Apparatus". In this prior approach, dual cantilever springs extended from a threaded nut structure to a head support structure. A lead screw rotated by a stepper motor engaged the threaded nut structure and thereby moved the head support structure coarsely across the tape during coarse head positioning operations. A linear voice coil motor was directly coupled to the head support structure and overcame a restorative bias spring force applied to the head by the dual cantilever springs. One drawback of this approach is that the springs were not stiff, but were flexible and susceptible to unwanted vibrations, requiring dampening structures or treatments.

A further prior art closed loop fine positioner for a tape head is disclosed in U.S. Pat. No. 5,379,170 to Schwarz, entitled: "Dynamically Adjustable Head Positioning Mechanism". This patent describes head carriage or stage which is coarsely positioned by a stepper motor lead screw relative to a tape transport base. The stage forms a lever which secures the tape head at one end and is pivotally mounted to a lead screw follower by a leaf spring which allows for longitudinal displacement of the head as well as pivotal displacement. An actuator attached to the stage rotates and thereby imparts limited rotational displacement of the head relative to the tape path to provide for fine position adjustments in real time. One drawback with this prior approach is lack of stiffness in that the leaf spring fails to isolate the head from vibrations which may be induced as the tape passes over the head. Another drawback with this prior approach is that the tape head does not remain perpendicular relative to the tape over the range of limited lateral displacement, thereby causing the tape to stretch and some of the reader-writer elements of the head to fail to register with previously-recorded tape tracks, particularly when the tape has been written by another tape transport not imparting identical rotational displacement to its head.

Thus, a hitherto unsolved need has remained for a coarse/fine dual actuator positioner which is much stiffer and less susceptible to unwanted vibrations than heretofore, and which avoids tape distortions otherwise resulting from rotating the tape head relative to the tape to provide fine position adjustments.

SUMMARY OF THE INVENTION WITH OBJECTS

A general object of the present invention is to provide a coarse/fine dual actuator positioner for lateral positioning of a tape head structure relative to a tape path which overcomes limitations and drawbacks of the prior art.

Another object of the present invention is to provide a dual actuator positioner for a tape drive which manifests a high level of mechanical rigidity and resistance to vibration in a manner overcoming limitations and drawbacks of the prior art.

Yet another object of the present invention is to provide a dual actuator positioner for a tape drive which is simplified over prior designs, which may be realized at a lower prime cost in manufacturing, and which operates reliably over the useful life of a tape transport with which the positioner is combined.

A still further object of the present invention is to provide a fine positioner for a tape head which employs a cam and follower arrangement in order to impart fine position adjustment to the tape head without rotating the tape head relative to the tape path.

In accordance with one aspect of the present invention a tape head actuator assembly includes a frame disposed relative to a tape path, a tape head guide extending from the frame transversely relative to the tape path, and a tape head engaging the tape head guide such that the tape head freely moves transversely and lineally relative to the tape path along the head guide. A lever is pivotally mounted to the frame at a fulcrum thereof. The lever defines a head guiding cam region for guiding the tape head. A cam follower region of the tape head is engaged by and follows the head guiding cam region. An actuator motor has a stator portion secured to the frame and an armature portion for moving the lever about the fulcrum over a limited displacement range. The actuator motor is responsive to fine head position control signals and thereby imparts fine position adjustment of the tape head along the head guide relative to the tape path without rotating the head relative to the tape.

In accordance with another aspect of the present invention a coarse and fine lateral head positioner is described for positioning a magnetic read/write head structure within a tape drive. The tape drive includes a base and defines a predetermined tape transport path relative to the base which leads a magnetic recording tape across the head structure. The coarse and fine lateral head positioner includes a coarse positioner, such as a stepper motor, mounted to the base. The stepper motor directly or indirectly rotates a threaded lead screw which extends generally perpendicular to the tape path. A head carriage assembly includes a threaded follower nut which engages the lead screw. A pivoting beam structure is pivotally mounted to the head carriage at a fulcrum for limited rotational displacement transversely relative to the tape transport path and displaces the head structure along a guide post so as to be in in confronting relation to a tape moving along the tape transport path. A camming arrangement between the pivoting beam structure and the head structure enables rotational motion to be translated into lineal motion of the head transverse to the tape path. A fine positioner prime mover, such as a voice coil actuator, has a fixed part mounted to the head carriage assembly and a moving part coupled to rotate the pivoting beam structure. In the particular arrangement being described the stepper motor provides lateral coarse head position control, and the voice coil motor provides lateral fine position control, of the head structure relative to the tape path. Accordingly, the head structure is coarsely positionable laterally among multiple sets of parallel tracks defined along a longitudinal direction of a magnetic tape moving along the tape transport path, and finely positionable to follow precisely a particular set of parallel tracks of the tape during a data writing or reading operation.

In this aspect of the invention the rigid beam structure may be mass balanced about a pivot axis relative to the head carriage assembly, and may further be mass balanced about the threaded lead screw. The rigid beam structure may preferably comprise two generally parallel beam sections joined at one end by a cam engaging a cam follower of the head structure and at another end by the moving part of the voice coil actuator.

In accordance with another aspect of the present invention a tape drive is provided for recording data onto a magnetic recording tape, and for reading data from the tape, by use of a magnetic head structure across which the tape is moving along a tape path. In this tape drive the magnetic head structure is positionable transversely relative to the direction of tape travel along the tape path in order to register with a multiplicity of lineal tape track positions. Further, the magnetic tape provides head structure fine position servo information which is sensible by a servo sensing function included within the magnetic head structure. Accordingly, the tape drive includes a support base, and a head carriage positionable relative to the support base and laterally relative to the tape path. A coarse positioning mechanism, such as a stepper motor and threaded lead screw, is mounted to the support base for moving the head carriage laterally relative to the tape path to position the head carriage at a selected one of multiple tape track positions. A rigid head support pivot structure including at least one rigid beam is rotationally journalled to the head carriage at a rotational pivot point and directly supports the magnetic head structure. A fine position servo control loop of the drive includes functional circuitry for receiving and processing sensed head structure fine position servo information into a fine position correction signal. A fine position voice coil actuator motor is mounted to the head carriage and is responsive to the fine position correction signal for rotating the rigid beam along a locus of limited rotational displacement which results in applying incremental lineal head structure displacement via a cam and follower mechanism in a direction generally lateral relative to the tape path.

In this aspect of the present invention, fine position servo information comprises optically sensible lineal servo tracks formed on a non-magnetic side of the magnetic recording tape, and the magnetic head structure includes an optical servo head for sensing one of the lineal servo tracks which corresponds to a group or set of magnetic recording tracks being followed by the head during a particular write or read operation.

These and other objects, advantages, aspects and features of the present invention will be more fully understood and appreciated upon consideration of the following detailed description of a preferred embodiment, presented in conjunction with the accompanying drawings.

DETAILED DESCRIPTION OF A PREFERRED EMBODIMENT

Figure 1:
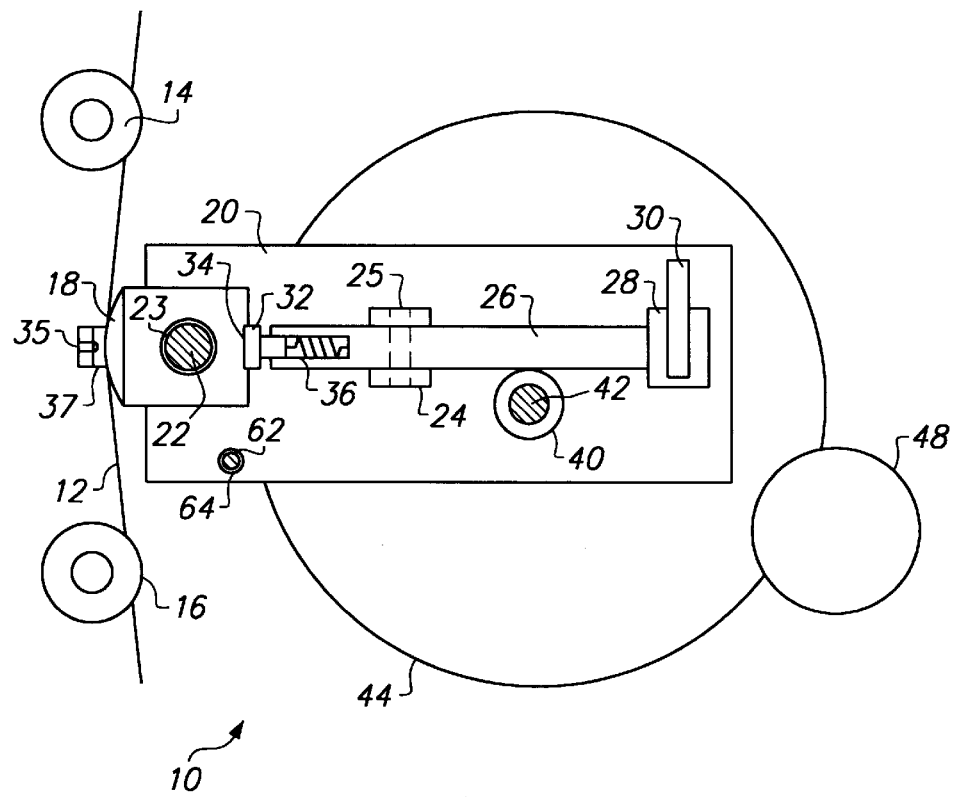
FIG. 1 is an enlarged diagrammatic plan view of a pivoting lever cam guide head fine positioner for a tape transport in accordance with principles of the present invention.
Figure 2:
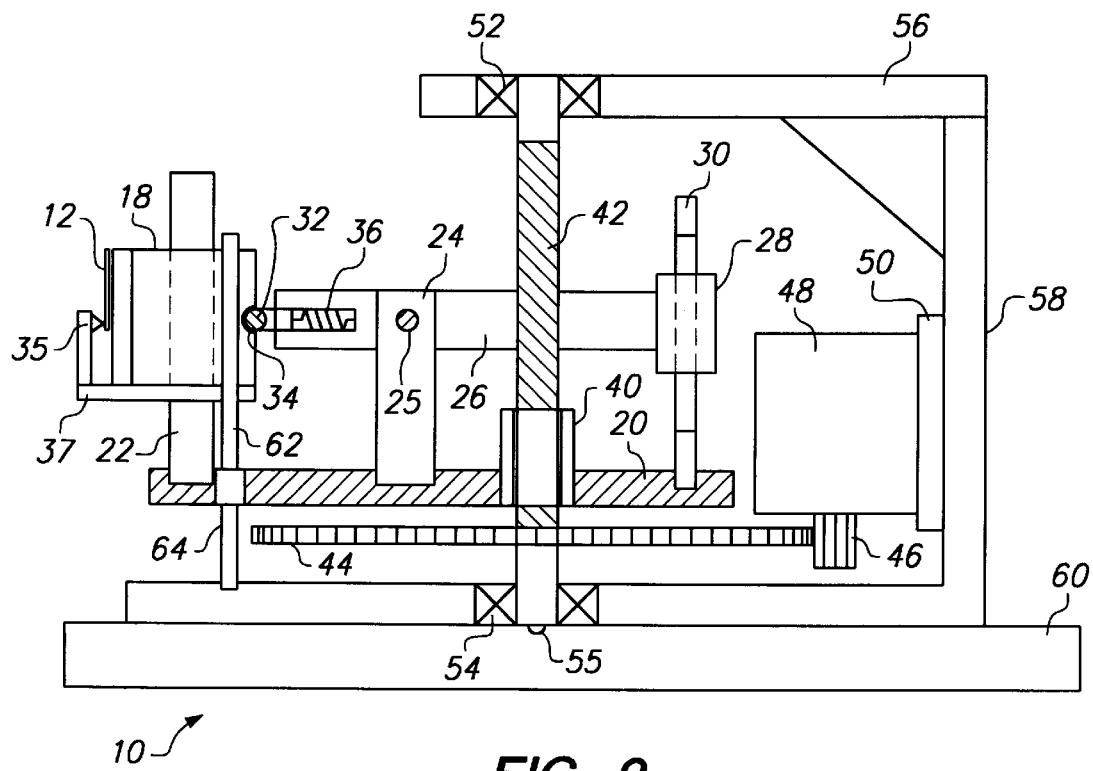
FIG. 2 is an enlarged view in side elevation of the FIG. 1 pivoting lever cam guide head fine positioner.

With reference to FIGS. 1 and 2 a tape transport 10 incorporating principles of the present invention includes a base 60 which supports and registers various structural and functional elements needed for effective tape transport, recording and playback. These elements typically include a supply tape reel holding a coil or pancake of magnetic recording tape, a small segment of which is marked by reference numeral 12 in FIG. 1, and a take-up tape reel, and associated reel motors (not shown in FIGS. 1 and 2 but present in a practical embodiment of the invention). The supply tape reel most preferably is contained within a single-reel tape cartridge and holds a supply, e.g. 1800 feet or more, of one half-inch magnetic recording tape. The single-reel tape cartridge is most preferably of the type marketed by the assignee of the present invention under the DLTtape (tm) brand of single reel linear streaming tape cartridges. Accordingly, the tape transport 10 includes a mechanism for receiving and engaging the single reel linear streaming tape cartridge, and causes tape 12 spooled on the supply reel to be drawn into the tape mechanism and across a head structure 18 along a tape path defined e.g. by tape guide rollers 14 and 16. These conventional mechanical elements and features are well understood by those skilled in the art and, except for the fact that the head structure 18, and guide rollers 14 and 16 may induce or amplify tape lateral motions which must be followed for proper tape recording and playback, are not particularly relevant to the present invention and are therefore not further described herein in substantial detail.

In accordance with principles of the present invention a pivoting lever cam guide tape head positioner subassembly is provided for positioning the multi-channel head structure 18 in a coarse, lateral direction relative to tape travel and in a fine, lateral direction perpendicular to tape travel. The head structure 18 is slidably mounted upon a head guide, such as cylindrical guide post 22 extending perpendicularly relative to the frame 20 and the travel path of tape 12. The head structure 18 may include a plastic bushing or bushings for facilitating relative sliding motion along the guide post 22 without stiction. The plastic bushings 23 may be formed of a suitable plastic material, such as Delrin™. A lever 26 is rotatably attached to the frame 20 at a dual leg fork-shaped fulcrum structure 24 as via a pin axle 25 extending through the fulcrum structure 24 and through a journal of the lever 26. An armature 28 formed at one end of the lever 26 cooperates with a stator assembly 30 fixed to the frame 20 to form a fine position voice coil actuator motor. This voice coil actuator motor translates electrical driving currents into rotary driving force which imparts rotational motion to the lever 26 relative to the frame 20 about the axis of limited rotation about pin axle 25. In practice, the amount of rotation is limited to a lateral head position correction typically in the range of a hundredth of an inch, or less, in order to compensate for lateral tape motion and flutter.

A cam 32 is formed at an end of the lever 26 to guide the head structure 18 laterally along the guidepost 22 as the lever 26 is rotated. The cam 32 engages e.g. a recessed cam follower surface 34 formed in a back wall of the head structure 18. A compression spring 36 applies a bias force to the cam 32 in order to maintain it in proper mechanical driving arrangement with the head 18. As the lever 26 is rotated about the fulcrum pin 25 by the voice coil actuator, rotational motion of the lever is translated into lineal motion of the head structure 18 along guide post 22 via the cam 32 and follower 34. As the lever 26 is rotated the head structure 18 is displaced laterally along the guide post 22 thereby to follow lateral tape motion and other lateral disturbances to proper tape positioning in accordance with a fine position error signal developed by a servo loop within the tape transport 10. This arrangement has resulted in a head fine positioner mechanism which is considerably stiffer than prior approaches, which manifests a very high natural resonant frequency, and which resists vibrations and other unwanted exciting forces in a superior manner.

In the embodiment of FIGS. 1 and 2, the cam pin 32 has an elongated engagement surface generally parallel to the direction of tape travel. This engagement surface with the follower surface 34 of the head structure 18 is made sufficiently long in order to stabilize and fix the head structure 18 in a desired tape-confrontation position, i.e., so that the head structure 18 is not free to rotate relative to the tape 12 about the guide post 22.

The head positioner also preferably includes a coarse positioner mechanism and function. The coarse positioner mechanism operates under electrical control, such as an incremental rotational motion stepper motor 48 which rotationally drives a lead screw 24. The motor 48 may be secured via a mounting bracket 50 to a base plate 58 of the head positioner subassembly. While a stepper motor is a presently preferred implementation of the coarse positioner, other incremental-motion-providing devices are clearly within contemplation for use as a coarse positioner. For example, a linear motor and shaft encoder providing angular position feedback could also be employed in lieu of the stepper motor 48 in a manner known to those skilled in the art. The motor 48 may drive the lead screw 24 directly, or a gearing arrangement such as a large spur gear 44 driven by a small pinion gear 46 rotated by the motor 48, may be employed, depending upon particular design and space considerations. In the embodiment shown in FIGS. 1 and 2 the lead screw 42 is driven by the large diameter spur gear 44 which in turn is driven by the pinion gear 44 mounted on the drive shaft of the motor 48. The lead screw 42 engages a threaded nut portion 40 of a carriage frame or platform 20. The threaded nut portion 40 may include a backlash-resisting feature to remove any unwanted mechanical hysteresis between the lead screw and the threaded nut portion. The lead screw 42 engages an upper bearing 52 secured to a top plate 56 of the head subassembly, and engages a lower bearing 54 of a base plate 58 of the head subassembly. A thrust bearing 55 may also be used between the lead screw 42 and a base plate 60 in order to maintain precise position of the lead screw 42 relative to the base 60 and the frame 20 and nut 40.

A structural guide feature of the base plate 58, such as guidepost 62, extends from the base plate 58 in parallelism with an axis of rotation of the lead screw 42. This feature or guidepost 62 is followed the frame 20 during coarse lateral displacements of the frame 20 in response to lead screw rotation. The post 62 may be formed of a suitable polished metal and a cylindrical bushing 64 extending through the platform 20 may be formed of a suitable self-lubricating plastic material, such as Delrin(tm). The guide post 62 and the bushing 64 maintain the frame 20 and head structure 18 at a desired confrontational orientation angle relative to the tape 12 while permitting the platform 20 and head structure 18 to be moved laterally relative to the tape path.

In addition to a multi-channel array of magnetic read/write heads confronting a storage medium surface of the tape 12, the tape head structure 18 may also include an optical servo head 35 supported on an integrally formed bracket 37. The optical servo head 35 senses e.g. lineal optical servo tracks 37 printed, etched, embossed or otherwise formed on a nonmagnetic back surface of the tape 12, most preferably during tape manufacturing. Since the optical tracks are always present, a closed loop fine position servo can obtain instantaneous lateral tape displacement information and use that information to provide fine adjustment of the head structure 34 into a proper registration with a track set being followed during tape streaming data writing/reading operations of the tape transport 10.

A fine positioner mechanism preferably may be implemented as a rotary voice coil motor, although other implementations including piezoelectric effect devices, etc., may be used in a particular design. In the FIGS. 1 and 2 embodiment, the mechanism includes, for example, an armature 28 comprising a voice coil wound on a suitable bobbin fixed to a distal end of the pivoting lever structure 26. A stator 30 comprises a magnetic core structure preferably formed as a laminar structure of soft magnetic core material and includes a bar-shaped permanent. A central opening of the voice coil 46 is oversized relative to a cross-section of a leg of the stator such that the voice coil is free to rotate and be displaced along the leg in response to a torque resulting from a directional current flowing through the voice coil. Alternatively, as shown in the FIGS. 6 and 7 embodiment, the positioner may comprise a moving permanent magnet 29 affixed to the distal end of the pivoting lever structure 26, and a stator coil 31 affixed to the platform or frame 20.

A bidirectionally-sourced driving current is caused to flow through the voice coil at all times in order to stabilize the pivoting lever 26 and thereby the head structure 18 at the desired position relative to the tape 12. Optionally, or alternatively a suitable spring such as a hair spring, leaf spring or coil spring, may be used to apply a static bias force to the pivoting lever 26 in order to bias it to a nominal position, such that a unidirectional driving current through the voice coil may be used to overcome the bias force and thereby incrementally fine position the head structure 18. If a spring bias force is employed, a solenoid actuator operated by a unidirectional fine position driving current may be employed as a fine positioner mechanism which operates to overcome the static bias force.

In the embodiment of FIGS. 1 and 2, the pivoting lever structure is approximately one-half inch long on each side of the pivot axis 25 and provides the head structure 18 with a limited transverse displacement range on the order of plus/minus 1–2 millinches relative to the tape 12. The roller guides 14 and 16 are located in close proximity to the head structure 18, such as within about one inch of an adjacent transverse edge of the head structure 18. The head structure 18 is arranged such that a track-to-track pitch of ten microns or less may be defined and followed. This track pitch enables track densities on the order of 2000 tracks per inch, or greater.

Figure 3:
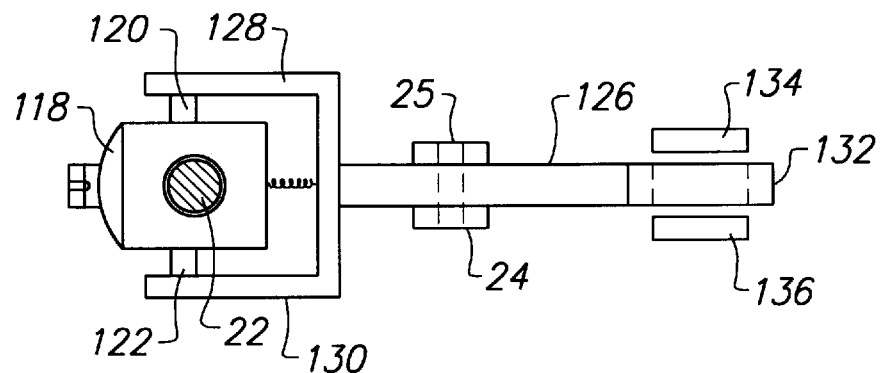
FIG. 3 is an enlarged diagrammatic plan view of an alternative pivoting lever cam guide head positioner for a tape transport in accordance with principles of the present invention.

FIG. 3 illustrates certain modifications which may be made to the FIGS. 1 and 2 embodiment. Where elements functionally remain unchanged from the FIGS. 1 and 2 embodiment such elements carry the same reference numerals previously assigned and are not further described in any particular detail. In FIG. 3, a head structure 118 includes lateral pin extensions 120 and 122 on opposite sidewalls. The pins 120 and 122 are aligned along an axis generally parallel with a direction of tape travel across the head 118. A pivoting lever 126 includes a forked portion having tines 128 and 130. Tine 128 engages pin 120, and tine 130 engages pin 122. When the lever 126 is rotated, the tines impart translational force to the pins and cause the head structure 118 to move up and down along the guide shaft 22. In the FIG. 3 example, a variant voice coil motor is also shown. In this variation, a flat coil 132 extends from a distal end of the arm 126 and includes two legs which pass through intense magnetic fields created by close proximity of permanent magnets 134 and 136. One of the legs passes through a north-south permanent magnet field, while the other leg passes through a south-north permanent magnet field. Driving current passing through the voice coil causes the arm 126 to pivot about the fulcrum axis 25 in a direction dependent upon driving current direction.

Figure 4:
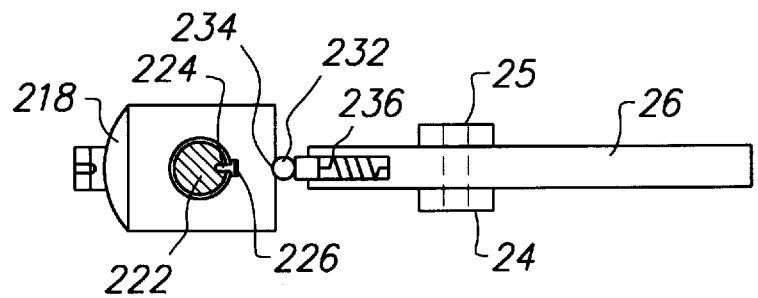
FIG. 4 is an enlarged diagrammatic plan view of an alternative pivoting lever cam guide head positioner for a tape transport in accordance with principles of the present invention.

In the FIG. 4 example, a head guide structure, such as guide post 222 incorporates a keying feature such as a longitudinal key 224 formed of a suitable material, such as polished metal. A key seat 226 is formed in a head structure 218 and follows the key 224 as the head 218 is displaced along the guidepost 222. A hemispherical surface of a cam 232 drivingly engages a hemispherical cam follower feature 234 formed on a back wall of the head structure 218 in order to translate rotational motion of the lever arm 26 to lineal motion of the head structure 218 along the guide post 222. A helical spring 236 is provided to spring-load the cam 232 against the cam follower 234. Alternatively, the key 224 may be spring biased against the key seat 226 in order to apply a suitable bias force between the cam follower 234 and the cam 232.

Figure 5:
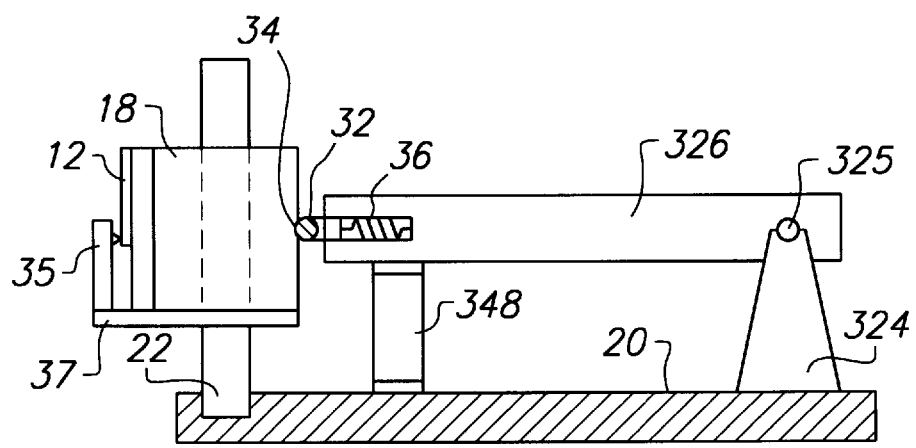
FIG. 5 is an enlarged diagrammatic view in side elevation of an alternative pivoting lever cam guide head positioner for a tape transport in accordance with principles of the present invention.

In the FIG. 5 example, a lever arm 326 has a fulcrum at an end thereof distal to the head structure 18 and pivots about a pivot axis pin 325. A piezoelectric device 348 is coupled between the frame or platform 20 and the arm 326 adjacent to the head 18. As electrical current is applied to the device 348, it expands or contracts, and thereby imparts rotational driving force to the arm 326 which is translated into lateral linear displacement of the head 18 as previously described.

Figure 7:
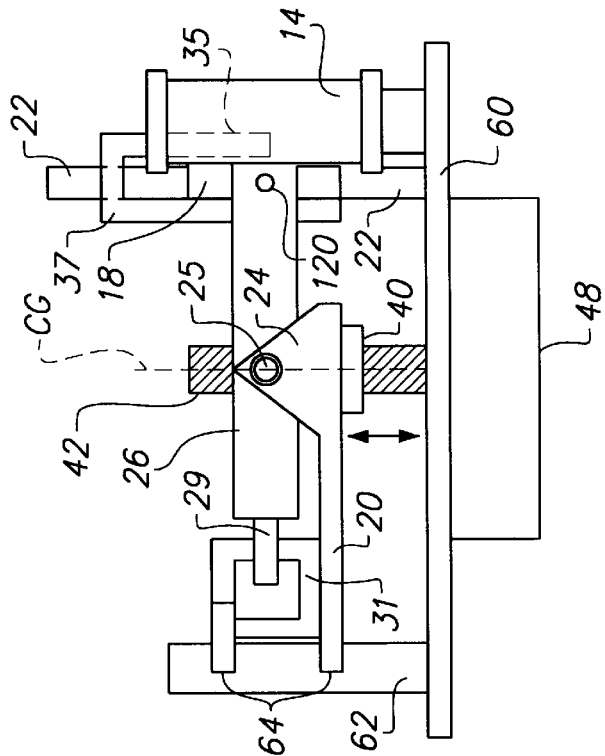
FIG. 7 is an elevational side view of the FIG. 6 embodiment of the present invention.
Figure 6:
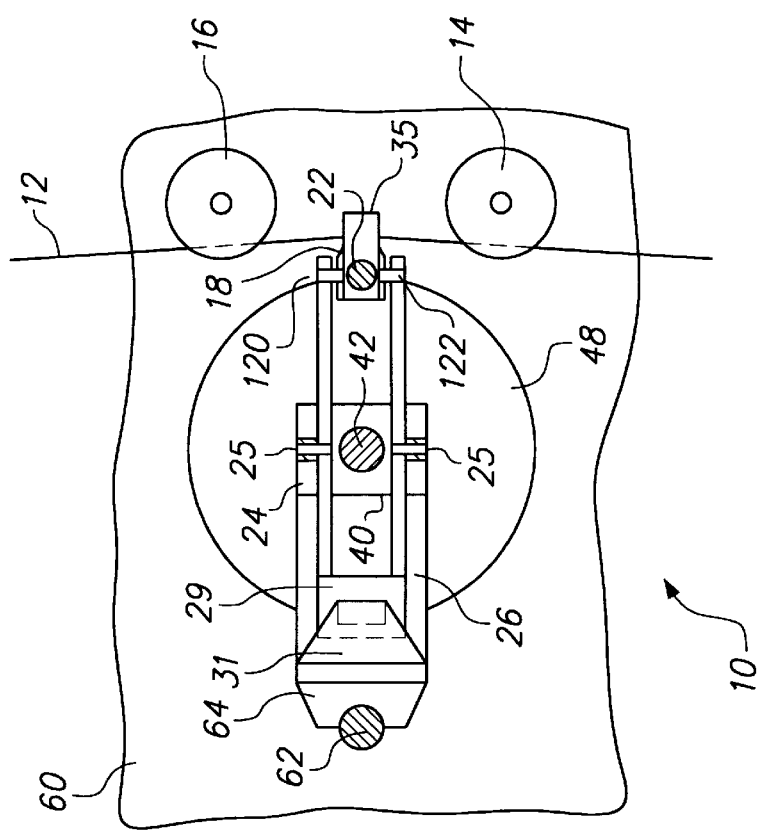
FIG. 6 is an enlarged diagrammatic plan view of yet another pivoting lever cam guide head positioner, similar to the FIG. 3 embodiment, which achieves mass balance about the lead screw, in accordance with principles of the present invention.

In the FIGS. 6 and 7 embodiment, the pivoting lever 26 is formed of two parallel beam sections which span the lead screw nut 40 and which also span the head 18 as in the FIG. 3 embodiment. By following the arrangement of FIGS. 6 and 7, mass balance of the pivoting lever structure 26, moving magnet 28 and head 18 about a center of gravity (coincident with an axis of rotation of the lead screw 42) is achieved. With such mass balance, the actuator achieves a desired immunity to external shock forces. In order to achieve mass balance, a location of the fulcrum 24 is chosen so that half of the effective mass of the head-pivot lever structure is on one side, and half of the effective mass is on the other side thereof. The pivot lever structure 26 may be spring biased toward the head 18 at the lead screw nut 40, or the head 18 may be spring biased away from the head guide post 22. Alternative biasing arrangements may also be employed.

Figure 8:
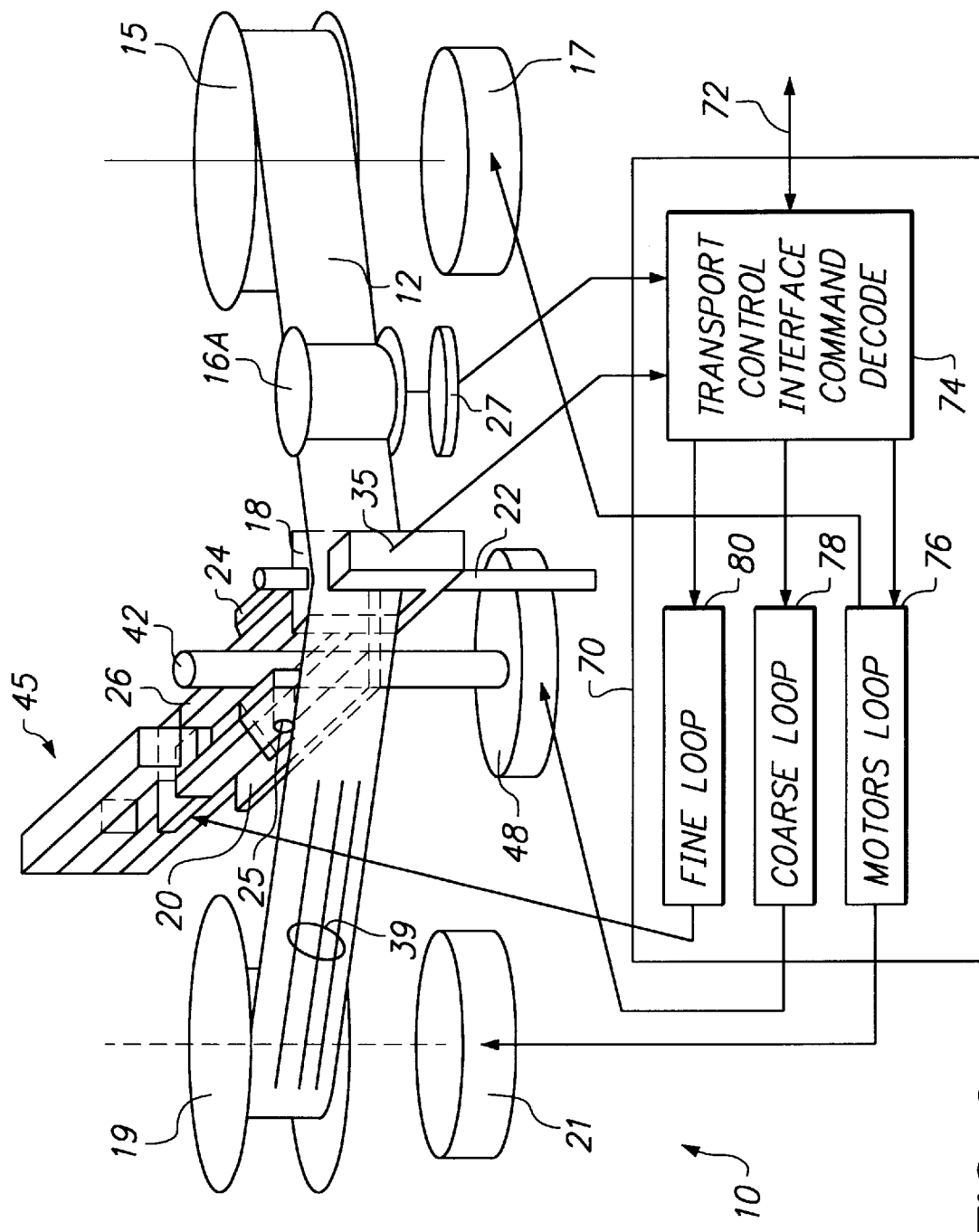
FIG. 8 is a diagrammatic view of a tape transport mechanism and control circuitry for controlling a pivoting lever cam guide head fine positioner incorporating a coarse head positioner in accordance with principles of the present invention.

Further details of the tape transport 10 are provided by the FIG. 8 diagrammatic example. Therein, a supply reel 15 supplies the tape 12. The reel 15 is preferably a part of a single-reel tape cartridge which includes a suitable buckling mechanism. The cartridge and buckling mechanism are conventional and are not described further. The reel 15 is rotationally engaged by a supply reel drive motor 17. A take-up reel 19 within the transport 10 is controlled by a take-up reel drive motor 21. The motors 17 and 21 are controlled independently by a motors control servo loop 76 in order to provide an appropriate amount of tension on the tape 12 irrespective of the relative diameters of the tape spools formed on the reels 15 and 19 at any particular time. The tape guide roller 16A is shown coupled to a tape speed-sensing device, such as tachometer 27. The tachometer 27 is used conventionally by the motors control loop 76 in controlling relative torque's applied by the motors 17 and 21.

A transport electronics circuit 70 includes a data and command interface bus 72 enabling the transport 10 to be connected to a computing environment. An interface command decode and user data processing unit 74 provides conventional tape command decode and status functions, and user data compression and expansion functions as well as error correction processes. It also supervises the motors loop 76, a coarse head position control loop 78 and a fine head position control loop 80. The coarse head position control loop is used to control the stepper motor 48 to position the head structure 18 at each nominal track set location. It should be understood that the transport 10 includes a plurality of parallel user data channels, such as 6–12 channels, and that each nominal coarse head position locates the head structure 18 at approximately each set of 6–12 tracks.

The fine head position control loop 80 responds to instantaneous tape position information sensed by e.g. the optical pickup head 35 from one of the optical servo track patterns 39 which corresponds to the set or group of lineal magnetic tracks presently being followed. Any positional offset or position error sensed by the optical head 3 will result in a corrective driving current passing through the voice coil of a fine position actuator 45. This current will apply a torque force to the arm 26, and the head structure 18, following the cam 32 of arm 26, will be displaced along guide post 22 and thereby be returned to a correct alignment with the optical tape tracks being followed (and in turn be returned to alignment with the magnetic tracks being written to, or being read from).

The optical servo track patterns 39 may provide continuous or discrete position error signals. Each track may be encoded with a unique value or code which enables the optical head 35 and main control module 74 to determine the nominal servo track being followed. Advantageously, the servo track patterns may be formed as a part of the tape manufacturing process, with the result that there need be no separate magnetic servo track writing operation as part of tape manufacturing. Conventional laser inscribing, embossing or patterning techniques may be used in real time during tape manufacture to provide the optical servo tracks 39.

While an optical-based fine position servo is presently most preferred, those skilled in the art will appreciate that the balanced coarse-fine pivoting lever tape head positioner of the present invention will work advantageously with conventional magnetic servo track patterns interspersed among data tracks. A magnetic servo track head and channel would be used in lieu of the optical tracks 37, optical head 36 and optical servo channel presently preferred.

Having thus described embodiments of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A tape head actuator assembly comprising:

a frame disposed relative to a tape path;

a tape head guide extending from the frame transversely relative to the tape path;

a tape head engaging the tape head guide such that the tape head freely moves transversely relative to the tape path along the head guide;

a fulcrum defined by the frame;

a lever pivotally mounted to the frame at the fulcrum, the lever defining a head guiding cam region;

a cam follower region defined by the tape head, the cam follower region contacting and engaging the head guiding cam region so that movement of the head guiding cam region results in movement of the cam follower region; and an actuator motor responsive to fine head position control signals and having a stator portion secured to the frame and an armature portion for moving the lever about the fulcrum over a limited displacement range thereby to impart fine positioning of the tape head along the head guide relative to the tape path.

2. The tape head actuator assembly set forth in claim 1 further comprising a coarse positioner mounted between a support base of a tape transport and the frame for moving the tape head actuator assembly transversely relative to the tape path for coarsely positioning the tape head at a selected one of multiple tape track nominal positions of the tape path in accordance with coarse positioning information.

3. The tape head actuator assembly set forth in claim 1 wherein the fulcrum is located between the head guiding cam region and the moving portion of the actuator motor.

4. The tape head actuator assembly set forth in claim 3 wherein the fulcrum is located at a center of mass balance of the lever and tape head.

5. The tape head actuator assembly set forth in claim 1 wherein the fulcrum is located adjacent to a fulcrum end region of the lever and wherein the moving portion of the actuator motor lies between the fulcrum end region and the head guiding cam region.

6. The tape head actuator assembly set forth in claim 1 wherein the head guiding cam region comprises a spring-loaded cam extending from the lever and wherein the cam follower region comprises a cam-receiver structure defined on a back wall of the tape head opposite to a tape-confronting front wall of the tape head.

7. The tape head actuator assembly set forth in claim 1 wherein the tape head guide comprises a shaft extending transversely from the frame.

8. The tape head actuator assembly set forth in claim 7 wherein the tape head is keyed to the shaft by a key feature thereby to restrict rotation of the tape head relative to the tape path.

9. The tape head actuator assembly set forth in claim 1 wherein the tape head guide comprises a plurality of parallel shafts extending transversely from the frame, and wherein the tape head engages the plurality of parallel shafts in order to restrict rotation of the tape head relative to the tape path.

10. The tape head actuator assembly set forth in claim 1 wherein the head guiding cam region and the cam follower region include cooperating structures for restricting rotation of the tape head relative to the tape path while enabling displacement of the tape head along the tape head guide.

11. The tape head actuator assembly set forth in claim 10 wherein the head guiding cam region includes a guide pin extending through the head guiding cam region of the lever and having two guiding surfaces, and wherein the cam follower region includes two surface followers for following the two guiding surfaces of the guide pin.

12. The tape head actuator assembly set forth in claim 10 wherein the head guiding cam region comprises a fork having two tines spanning the tape head, and wherein the cam follower region includes tine follower surfaces on opposite side walls of the tape head.

13. A tape drive for recording data onto a magnetic recording tape, and reading data from the tape, via a magnetic head structure across which the tape is moving along a tape path within the drive, wherein the magnetic head structure is positionable transversely relative to the direction of tape travel along the tape path in order to register with a multiplicity of lineal tape track positions, the tape drive comprising:

a support base, a head carriage positionable relative to the support base and laterally relative to the tape path, coarse positioning means mounted to the support base for moving the head carriage laterally relative to the tape path to position the head carriage at a selected one of multiple tape track positions in accordance with coarse positioning information, a head guide defined by the head carriage for guiding the magnetic head structure transversely relative to the direction of tape travel, the magnetic head structure being slidably mounted to the head guide, fine positioning means pivotally mounted at a pivot axis to the head carriage and having a cam engaging a cam follower of the head structure for displacing the magnetic head structure along the head guide, fine position actuator means mounted to the head carriage and responsive to fine position correction information for rotating the fine positioning means along a locus of limited rotational displacement for adjusting head structure displacement generally laterally relative to the tape path about the rotational pivot axis in order to enable the head to follow more precisely a particular recording track of a magnetic recording tape traveling along the tape path.

14. The tape drive set forth in claim 13 wherein the fine positioning means comprises a head pivot structure including at least one rigid beam rotationally mounted to the head carriage at the rotational pivot axis.

15. The tape drive set forth in claim 13 wherein the fine position actuator means comprises a voice coil actuator motor having a fixed part secured to the head carriage and a moving part secured to rotate the fine positioning means about the pivot axis.

16. The tape drive set forth in claim 15 wherein the fine position voice coil actuator motor means is mounted to the rigid fine positioning means at an end thereof opposite to an end mounting the magnetic head structure.

17. The tape drive set forth in claim 15 wherein the fine positioning means comprises a head pivot structure including at least one rigid beam rotationally mounted to the head carriage at the rotational pivot axis and wherein the fine position voice coil actuator motor comprises a voice coil mounted to the rigid beam at a location away from the pivot axis, and a permanent magnet and magnetic core mounted to the head carriage and having at least one leg portion passing through a central opening of the voice coil such that driving current representing the fine position correction information passing through the voice coil causes rotational adjustment of the beam and sliding lineal displacement of the magnetic head structure along the head guide laterally relative to the tape path.

18. The tape drive set forth in claim 13 wherein the coarse positioning means comprises a stepper motor mounted to the support base and including a lead screw, and wherein the head carriage includes a carriage nut engaging the lead screw, such that rotation of the lead screw causes the head carriage to be positioned relative to the support base and laterally relative to the tape path at each one of the multiple nominal tape track positions.

19. The tape drive set forth in claim 18 wherein the rigid fine positioning means comprises two beams having pivot points aligned with the pivot axis and wherein the two beams are separated by the lead screw.

20. The tape drive set forth in claim 19 wherein the aligned pivot points of the two beams are substantially aligned with an axis of rotation of the lead screw.

21. The tape drive set forth in claim 19 wherein the pivot points of the two beams are located along a pivot axis location of the head carriage between the lead screw and the magnetic head structure.

22. The tape drive set forth in claim 19 wherein the head pivot structure is mass balanced about the pivot axis.

23. The tape drive set forth in claim 18 wherein the magnetic tape has prerecorded head structure fine position servo information and wherein the magnetic head structure includes at least one read head for reading the head structure fine position servo information.

24. The tape drive set forth in claim 23 further comprising a fine position servo control loop including means for receiving and processing sensed head structure fine position servo information into a fine position correction signal and for applying the fine position correction signal to control the fine position actuator means.

25. The tape drive set forth in claim 24 wherein the head structure fine position servo information comprises optically sensible lineal servo tracks formed on a non-magnetic side of the magnetic recording tape, and wherein the magnetic head structure includes an optical servo head for sensing one of the lineal servo tracks.

26. The tape drive set forth in claim 13 wherein the rigid fine positioning means comprises two beams having pivot points aligned with the pivot axis, each having a cam engaging a cam follower defined on opposite sides of the magnetic tape head structure.

27. The tape drive set forth in claim 13 further comprising a plurality of tape path guides mounted to the support base adjacent to the magnetic head structure for limiting lateral tape motion of the magnetic tape moving along the tape path.

28. A coarse and fine lateral head positioner for positioning a magnetic read/write head structure within a tape drive having a base and a predetermined tape transport path relative to the base and across the head structure, the positioner comprising:
   a stepper motor mounted to the base,
   a threaded lead screw rotated by the stepper motor,
   a head carriage assembly including a threaded follower nut engaging the lead screw and including a follower surface for following a registration feature extending from the base as the lead screw is rotated and the carriage assembly moves transversely relative to the tape transport path,
   a tape head guide defined by the head carriage assembly extending transversely relative to the tape transport path,
   the magnetic read/write head structure slidably mounted onto the tape head guide,
   a rigid beam structure pivotally mounted to the head carriage for limited rotational displacement transversely relative to the tape transport path,
   the rigid beam structure having at least one cam for guiding a cam follower of the head,
   a voice coil actuator having a fixed part mounted to the head carriage assembly and a moving part coupled to rotate the beam structure,
   the stepper motor for providing lateral coarse head position control, and the voice coil motor for providing lateral fine position control, of the head structure relative to the tape path, such that the head structure is coarsely positioned laterally among multiple sets of parallel tracks defined along a longitudinal direction of a magnetic tape moving along the tape transport path, and finely positioned to follow precisely a particular set of parallel tracks of the tape during a data writing or reading operation.

29. The coarse and fine lateral head positioner set forth in claim 28 wherein the rigid beam structure and read/write head structure are together mass balanced about a pivot axis relative to the head carriage assembly.

30. The coarse and fine lateral head positioner set forth in claim 29 wherein the rigid beam structure and read/write head structure are together mass balanced about the threaded lead screw.

31. The coarse and fine lateral head positioner set forth in claim 28 wherein the rigid beam structure comprises two generally parallel beam sections joined at one end by the head structure and at another end by the moving part of the voice coil actuator.

32. The coarse and fine lateral head positioner set forth in claim 28 wherein the registration feature extending from the base comprises a post mounted to the base and parallel to a longitudinal axis of rotation of the lead screw.

33. The coarse and fine lateral head positioner set forth in claim 28 wherein the tape head guide comprises at least one guide post mounted to the base and wherein the read/write head structure slideably engages the guide post.

34. The coarse and fine lateral head positioner set forth in claim 28 further comprising bias force providing means for biasing said at least one cam into guiding contact with said cam follower of the read/write head structure.

35. A tape head actuator assembly adapted to move a tape head relative to a tape that moves along a tape path, the actuator assembly comprising:
   a frame;
   a tape head guide secured to the frame, the tape head guide being adapted to guide movement of the tape head so that the tape head moves transversely relative to the tape path along the guide;
   a lever that pivots relative to the frame, the lever including a head guiding cam region that is coupled to the tape head so that movement of the head guiding cam region results in movement of the tape head transversely relative to the tape path along the tape head guide; and
   a motor coupled to the lever, the motor being adapted to move the lever and the head guiding cam region.

36. The tape head actuator assembly of claim 35 including a fulcrum secured to the frame, wherein the lever is pivotally mounted to the fulcrum.

37. The tape head actuator assembly of claim 35 including a tape head having a cam follower region, the cam follower region contacting the head guiding cam region and moving with the head guiding cam region.

38. The tape head actuator assembly of claim 35 wherein the head guiding cam region is adapted to pivot relative to the tape head.

39. The tape head actuator assembly of claim 35 including a coarse positioner that is linked to the frame and moves the frame substantially transversely to the tape path.

40. The tape head actuator assembly of claim 35 wherein the tape head guide extends from the frame substantially transversely to the tape path.

41. The tape head actuator assembly of claim 35 wherein the tape head guide includes a shaft that extends substantially transversely from the frame.

42. The tape head actuator assembly of claim 41 wherein the shaft includes a key feature that restricts rotation of the tape head relative to the tape path.

43. A tape drive including the tape head actuator assembly of claim 35.

* * * * *